US008683454B1

(12) United States Patent
Muggli (10) Patent No.: US 8,683,454 B1
(45) Date of Patent: Mar. 25, 2014

(54) REDUCING REDUNDANCY IN SOURCE CODE

(75) Inventor: Martin D. Muggli, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 104 days.

(21) Appl. No.: 13/528,673

(22) Filed: Jun. 20, 2012

(51) Int. Cl.
*G06F 9/45* (2006.01)

(52) U.S. Cl.
USPC ............................................ 717/159

(58) Field of Classification Search
USPC ............................................ 717/159
See application file for complete search history.

(56) References Cited

U.S. PATENT DOCUMENTS

| 7,353,501 | B2* | 4/2008 | Tang et al. | 717/130 |
| 7,503,035 | B2* | 3/2009 | Zeidman | 717/123 |
| 2005/0114840 | A1* | 5/2005 | Zeidman | 717/126 |
| 2007/0055960 | A1* | 3/2007 | Damron et al. | 717/131 |
| 2008/0052662 | A1* | 2/2008 | Zeidman | 717/100 |
| 2008/0270991 | A1* | 10/2008 | Zeidman | 717/126 |

OTHER PUBLICATIONS

Wikipedia, "Currying", retrieved online Jun. 20, 2012, 4 pgs., en.wikipedia.org/wiki/Currying.
Wikipedia "Defunctionalization", retrieved online Jun. 20, 2012, 3 pgs., en.wikipedia.org/wiki/Defunctionalization.

* cited by examiner

*Primary Examiner* — Philip Wang
(74) *Attorney, Agent, or Firm* — Kevin T. Cuenot (57) ABSTRACT

Processing program code can include comparing functions specified in program code to identify a function group including a plurality of matching functions. A generalized function can be generated, using a processor, for the function group that implements an algorithm common to each of the plurality of matching functions. For each function of the function group, a wrapper function associated with the function can be generated, wherein each wrapper function calls the generalized function. A version of the program code including the generalized function and the wrapper function in place of each function of the function group can be created.

20 Claims, 4 Drawing Sheets

REDUCING REDUNDANCY IN SOURCE CODE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments disclosed within this specification relate to compiling computer program code.

BACKGROUND

A "compiler" generally refers to a computer program, or collection of computer programs, that transforms source code into a different, target form that can be consumed, e.g., executed or interpreted, by a computer system. For example, a compiler can translate source code specified in a human readable format that is not executable by the computer system into a target form such as object code that can be executed by the computer system.

A compiler can translate source code into the target form in one or more translation stages. In some cases, an early translation stage of a compiler can generate a large volume of program code, e.g., in an intermediate format, that includes many highly specialized functions. In such cases, subsequent translation stages of the compiler that operate on the large volume of program code can require significant time and computing resources to complete translation of the source code into the target form.

SUMMARY

One or more embodiments disclosed within this specification relate to compiling computer program code.

An embodiment can include a method. The method can include comparing functions specified in program code to identify a function group including a plurality of matching functions and generating, using a processor, a generalized function for the function group that implements an algorithm common to each of the plurality of matching functions. The method further can include, for each function of the function group, generating a wrapper function associated with the function, wherein each wrapper function calls the generalized function. A version of the program code including the generalized function and the wrapper function in place of each function of the function group can be created.

Another embodiment can include a system. The system can include a processor configured to initiate executable operations. The executable operations can include comparing functions specified in program code to identify a function group including a plurality of matching functions and generating a generalized function for the function group that implements an algorithm common to each of the plurality of matching functions. The method further can include, for each function of the function group, generating a wrapper function associated with the function, wherein each wrapper function calls the generalized function. A version of the program code including the generalized function and the wrapper function in place of each function of the function group can be created.

Another embodiment can include a non-transitory computer-readable medium having instructions which, when executed by a processor, perform operations. The operations can include comparing functions specified in program code to identify a function group including a plurality of matching functions and generating a generalized function for the function group that implements an algorithm common to each of the plurality of matching functions. The method further can include, for each function of the function group, generating a wrapper function associated with the function, wherein each wrapper function calls the generalized function. A version of the program code including the generalized function and the wrapper function in place of each function of the function group can be created.

DETAILED DESCRIPTION OF THE DRAWINGS

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to compiling computer program code. In accordance with the inventive arrangements disclosed within this specification, program code in a first format, e.g., source code, can be optimized for compilation into another, different format specified in a target code such as, for example, object code, bytecode, etc. The optimization applied to the program code can reduce the amount of program code that is actually translated, or processed, into the target code. Accordingly, the amount of time required and the amount of computational resources needed for compilation can be reduced. The optimization further can reduce the amount of target code that is generated and, as such, reduce the amount of memory needed to execute the resulting target code. The various operations described within this specification can be implemented as a standalone function or implemented as part of a larger compilation process.

Figure 1:
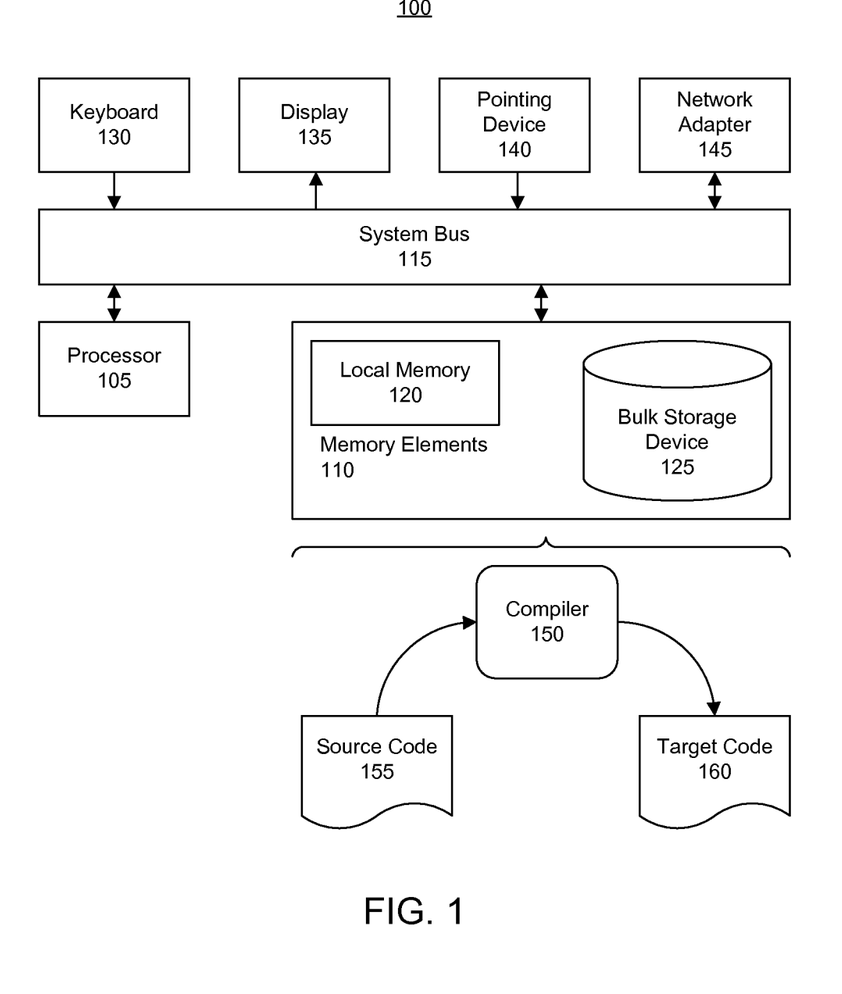
FIG. 1 is a block diagram illustrating an exemplary data processing system in accordance with one or more embodiments disclosed within this specification.

FIG. 1 is a block diagram illustrating an exemplary data processing system (system) 100 in accordance with an embodiment disclosed within this specification. System 100 can include at least one processor 105 coupled to memory elements 110 through a system bus 115 or other suitable circuitry. As such, system 100 can store program code, e.g., compiler 150, within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system including a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to system 100. The I/O devices can be coupled to system 100 either directly or through intervening I/O controllers. A network adapter 145 also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

As pictured in FIG. 1, memory elements 110 can store a compiler 150. Compiler 150, being implemented in the form of executable program code, can be executed by system 100 and, as such, can be considered part of system 100. In general, compiler 150 can be configured to process program code such as source code 155 by translating source code 155 into target code 160. Target code 160 can include, but is not limited to, object code, bytecode, or the like. In compiling source code 155, compiler 150 can perform the operations necessary for translating source code 155 into target code 160 in one or more different stages in which each stage generates a representation of source code 155 in an intermediate format or programming language.

Within this specification, the phrase "program code" is intended to refer to any type of computer and/or processor instructions, whether specified in a human readable form not usable by a computer without first translating the program code or a form that is usable by a computer, i.e., directly usable by the computer. The phrase "usable by a computer" can refer to program code that is executable by a computer, e.g., object code, a bitstream, or the like, or to program code that is interpretable by a computer, e.g., bytecode or a script, without performing any additional or further translation of the program code.

Source code 155 can refer to a form of program code having one or more statements in which a computer program is initially written before translation into another form such as machine language or the like. In general, source code 155 is written or specified in a human readable form and is not usable by a computer system without at least one translation of source code 155 to another form, e.g., a compilation operation.

Compiling source code 155 refers to a process in which source code 155 is translated to target code 160, which is usable by a computer. One example of source code 155 can include program code written in a high level programming language such as "C," "C++," or the like. Typically, each instruction in a high level programming language is translated into two or more instructions in the target code, e.g., assembly language or machine language.

Another example of source code 155 can include program code written in a hardware description language (HDL). HDL refers to a computer-language that facilitates the documentation, design, and manufacturing of a digital system, such as an integrated circuit (IC). An HDL combines program verification techniques with expert system design methodologies. Using HDL, for example, a user can design and specify an electronic circuit, describe the operation of the circuit, and create tests to verify operation of the circuit. In general, HDL includes standard, text-based expressions of the spatial and temporal structure and behavior of the electronic system being modeled. HDL syntax and semantics include explicit notations for expressing concurrency. In contrast to other programming languages, e.g., high level programming languages, HDL also includes an explicit notion of time, which is a primary attribute of a digital system.

Figure 2:
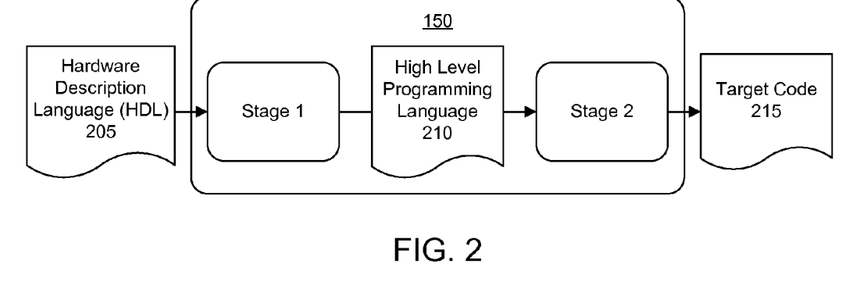
FIG. 2 is a block diagram illustrating the compiler of FIG. 1 in accordance with another embodiment disclosed within this specification.

FIG. 2 is a block diagram illustrating compiler 150 of FIG. 1 in accordance with another embodiment disclosed within this specification. Like numbers will be used to refer to the same items throughout this specification. As shown, compiler 150 can include multiple stages labeled "stage 1" and "stage 2." While two stages are illustrated, it should be appreciated that compiler 150 can include one or more additional stages or fewer stages, e.g., a single stage, as the case may be.

For purposes of illustration, the type of program code that is being processed is source code in the form of HDL 205. Stage 1 of compiler 150 can translate HDL 205 into high level programming language 210. For example, high level programming language 210 can be C, C++, or any of a variety of other such high level programming languages that can be used as an intermediate format within compiler 150. Stage 2 of compiler 150 can translate high level language 210 into target code 215. In the example illustrated in FIG. 2, target code 215 can be implemented as a bitstream.

In general, a bitstream refers to compiled program code, e.g., a binary file, that can be loaded into a programmable IC. Examples of programmable ICs can include, but are not limited to, field programmable gate arrays, complex programmable logic devices, or an IC in which some or all of the functionality of the device is controlled by data bits provided to the device for that purpose. Upon loading the bitstream into the IC, the IC is configured to implement physical circuitry (e.g., a digital system) therein as specified by HDL 205.

Still, other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Since a bitstream is a binary file, a bitstream can be considered a particular type, or subset, of object code. The object code is usable within a programmable IC to configure the IC to implement physical circuitry as opposed to including instructions that are executed by a processor. In any case, though FIG. 2 illustrates a case in which target code 215 is implemented as a bitstream, compiler 150 can be configured to output other varieties of target code including, but not limited to, object code that includes executable instructions, bytecode, or the like. For purposes of explanation, further operations of compiler 150 are not illustrated such as linking of object code with any necessary library functions that may be performed to generate a final executable file or files.

FIG. 2 illustrates an example in which program code is first converted into an intermediate format, which is a high level programming language. In one or more other embodiments, the source code can be converted into an abstract syntax tree and then further converted into an intermediate representation before being converted into an output representation. Appreciably, depending upon the desired format, the output representation can be further translated, if so desired, by further compilation stages.

Figure 3:
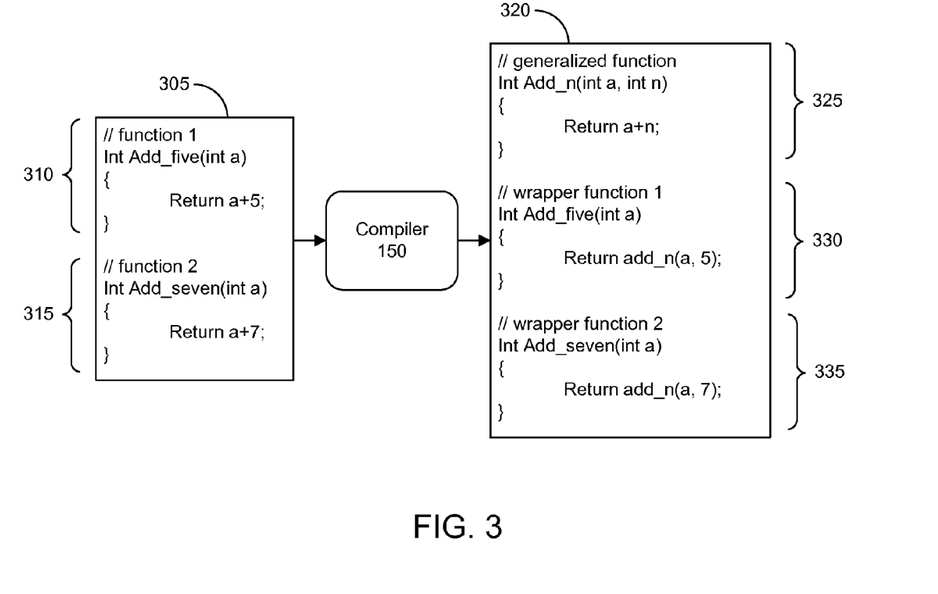
FIG. 3 is a block diagram illustrating the compiler of FIG. 1 in accordance with another embodiment disclosed within this specification.

FIG. 3 is a block diagram illustrating a processing technique implemented within compiler 150 of FIG. 1 in accordance with another embodiment disclosed within this specification. In the example illustrated in FIG. 3, compiler 150 can receive program code 305 as an input. In the example illustrated, program code 305 can be source code specified in a high level programming language. Program code 305 can originate from any of a variety of different sources or situations. In one aspect, program code 305 can be a translation of source code specified in another programming language (e.g., HDL) that is generated by an earlier stage of compiler 150, for example, as illustrated with reference to FIG. 2. In another aspect, program code 305 can be machine generated, e.g., automatically generated by a computing system. In still another aspect, program code 305 can be written or authored by a human user.

Compiler 150 can process program code 305 to generate program code 320 as an output. Program code 320 can be source code specified in a high level programming language. For example, program code 320 can be specified in the same high level programming language as program code 305. As used herein, "outputting" and/or "output" can mean storing in memory elements of a system, for example, writing to a file stored in memory elements, writing to a display or other peripheral output device, sending or transmitting to another system, exporting, or the like.

Program code 305 illustrates an example in which two functions, labeled function 310 and function 315, differ from one another only in the constant value that is used within each respective function. For purposes of discussion, the name (e.g., the identity) of each function, e.g., "function 1" for function 310 and "function 2" for function 315, is not included in the comparison. Function 1 and function 2 can be referred to as "original functions" of a computer program.

As used within this specification, an "original function" refers to a function that contains one or more algorithms. In some cases, an original function refers to a function that includes one or more algorithms and one or more constants, e.g., constant data. Each original function has an identity, e.g., "function 1" or "function 2," that is referred to elsewhere within the computer program in which the original functions are included. In this example, the identity, as used elsewhere within the computer program, represents a specific set of one or more constants of the original function and/or a specific algorithm of the original function.

Within program code 305, function 310 differs from function 315 only in that the constant value added to "a" is different in function 310 than in function 315. Function 310 adds a constant value (e.g., a literal in the case of source code and an immediate value in the case of machine code) of 5, whereas function 315 adds a constant value (e.g., a literal in the case of source code and an immediate value in the case of machine code) of 7. It should be appreciated that the functions can be longer than illustrated and in such a scenario, each portion other than the noted constants and names of function 310 and function 315 match identically.

Two or more functions that differ only in name and/or the constants that are included within the respective functions can be said to match and can be referred to as a "function group." Referring to the example of FIG. 3, function 310 and function 315 represent a function group. Function 310 and function 315 are each members of the same function group. The differing constants, e.g., 5 and 7 in this example, can be referred to as a constant set. Each constant of a constant set is located in a same relative location within the functions of the function group. Thus, as used within this specification, a constant set refers to constants that are stored in a same relative location from one function of a function group to another function of the same function group as illustrated. The constant 5, for example, is at a particular location within function 310; and constant 7 is at a same relative location within function 315.

Compiler 150 can compare function 310 to function 315. In performing the comparison, compiler 150 can recognize that the only difference between function 310 and function 315 is the value of the constant used in each respective function. As noted, the identity of the function is not used for purposes of comparison. The system can determine that constant members of the constant set have a different value from one member function to another. As used within this specification, a "member function" refers to a function that belongs to, or is within, a same function group. A "function group" refers to functions that are said to "match," e.g., are "matching functions," in which each such function implements a same algorithm with zero or more constants that differ. Accordingly, member functions of a same function group are matching functions. The terminology relating to function groups, e.g., matching or member functions, refers to program code that is being processed by compiler 150, e.g., to functions within program code 305 as opposed to functions of compiler 150 itself. Thus, functions 310 and 315 are members, or member functions, of a same function group.

Accordingly, compiler 150 can generate program code 320, which is a different version of program code 305. Compiler 150 includes a newly generated generalized function 325 within program code 320 for the function group including functions 310 and 315. In generating generalized function 325, compiler 150 can replace the constant that differs between functions 310 and 315, e.g., the constant set, with an argument, e.g., a variable, that can be passed to generalized function 325 when called. Thus, as shown, generalized function 325 includes an argument "n" in place of the constant value of "5" and/or "7." Generalized function 325 is the same as function 310 and function 315 in all other respects. Again, for purposes of illustration, the name of each function is not included in the comparison.

Compiler 150 can generate wrapper function 330 for function 310 of source code 305 and wrapper function 335 for function 315 of source code 305. Each of wrapper functions 330 and 335 can be configured to call generalized function 310. Rather than including the program code of function 310 within wrapper function 330, wrapper function 330 includes only a call to generalized function 325. In calling generalized function 325, wrapper function 330 passes a value of "5" as the value for the argument "n" that replaced the constant "5" in function 310. Similarly, rather than including the program code of function 315 within wrapper function 335, wrapper function 335 includes only a call to generalized function 325. In calling generalized function 325, wrapper function 335 passes a value of "7" as the value for the argument "n" that replaced the constant "7" in function 315.

In effect, wrapper function 330 replaces function 310 within program code 320. Similarly, wrapper function 335 replaces function 315 within program code 320. In the example shown in FIG. 3, the same function names are used for function 310 and the associated wrapper function 330. It should be appreciated that the names can be altered to a unique identifier or other unique name so long as compiler 150 replaces each instance in which function 310 (or 315, for example) is called with the new name used for the associated wrapper function.

As illustrated in FIG. 3, each wrapper function includes constant data and a reference to a generalized function. One wrapper function is generated for each member function of a function group. Further, one generalized function is generated for the entire function group. The generalized function, in effect, implements the algorithm or functionality that is common to each of the original functions, e.g., member functions of the function group. The wrapper function(s) serve as the mechanism to provide the generalized function with constant data, e.g., specific constant(s).

While FIG. 3 illustrates the replacement of only a single constant set with an argument, it should be appreciated that functions can differ with respect to more than one constant set. In that case, a second set of two or more constants that differ among the original functions of the same function group can be replaced with a second and different argument within the generalized function. The argument used for a constant set can be unique to the constant set. Each constant of the second constant set is located in a same relative location within the original functions of the function group. Accordingly, each wrapper function also passes the appropriate value to the replacement function for the second argument.

After the optimization process illustrated within FIG. 3, program code 305 is transformed into a new or different version, i.e., program code 320. It should be appreciated that the length of the various functions depicted is not necessarily indicative of the length of the actual functions that can be processed using the technique illustrated in FIG. 3. Typical functions, e.g., functions 310 and 315, can be much longer. Further, the number of functions that match in all respects except for one, two, three or potentially many more constants can number into the thousands or more. Accordingly, the process illustrated in FIG. 3 potentially reduces the amount of program code that is to be translated into target code thereby reducing the time needed for compilation. Further, the process illustrated in FIG. 3 can reduce the amount of memory needed or occupied by the resulting target code, e.g., the size of the resulting target code.

In accordance with another aspect, when dealing with function groups with more than one constant set, compiler 150 can be configured to generate generalized functions and wrapper functions using any of a variety of different techniques. For example, consider an original function such as {return 2+2;}. In one example, compiler 150 recognizes two different constants, e.g., a and b for a+b. Thus, compiler 150 generates a generalized function such as {return a+b}, which requires two arguments. Compiler 150 recognizes that two numbers, e.g., two constants, are to be added together. In another example, compiler 150 recognizes recurring values and generates a function such as {return c+c}, which requires only one argument. In this example, compiler 150 determines that one number, e.g., constant, is added to itself. Compiler 150 can be placed in different operating modes such as one in which the number of arguments needed for a given generalized function are minimized, which results in selecting the second example.

FIG. 3 has been described using a technique in which values are provided for arguments by passing the arguments directly to the generalized function when called by the wrapper function. It should be appreciated that this technique is provided for purposes of illustration only and that other techniques for providing values to the generalized function(s) can be used. As such, the one or more embodiments disclosed within this specification are not intended to be limited by the particular manner in which values are provided for arguments when calling the generalized function.

In another example, pointers can be used where values for arguments are provided to the generalized function from the caller, e.g., wrapper function, using a pointer, or pointers, to an array of argument values. In still another example, compiler 150 can generate a global table of constants. In that case, each caller can provide the generalized function with an index into the global table of constants. For example, the index can select a row containing the constants specific to the caller. In each case, the caller provides the generalized function with values for arguments that are specific to the caller.

For purposes of illustration, multiple stages of compiler 150 are not illustrated. The process illustrated in FIG. 3 can be implemented within a particular stage of compiler 150. For example, the process illustrated in FIG. 3 can be implemented within stage 1, stage 2, or another intermediate stage not shown within compiler 150. Accordingly, the program code can be specified as source code, another intermediate format such as an abstract syntax tree, or the like.

Figure 4:
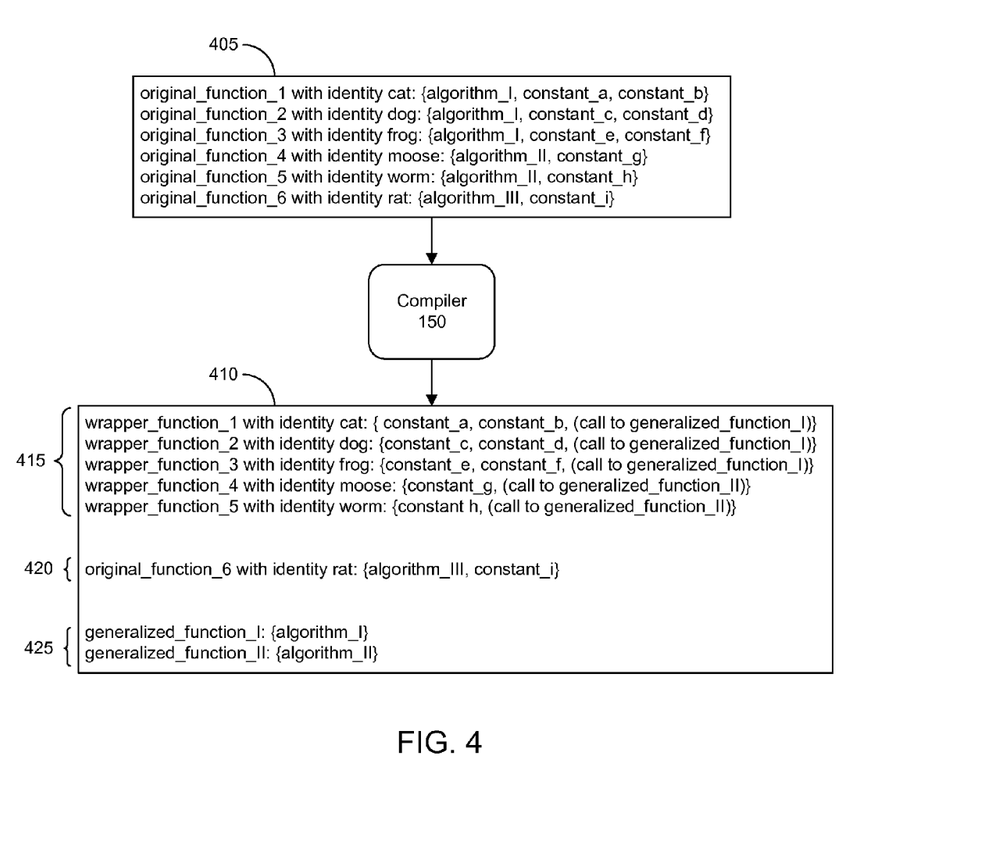
FIG. 4 is a block diagram illustrating the compiler of FIG. 1 in accordance with another embodiment disclosed within this specification.

FIG. 4 is a block diagram illustrating a processing technique implemented within compiler 150 of FIG. 1 in accordance with another embodiment disclosed within this specification. FIG. 4 presents a more generalized example using pseudo code in which compiler 150 receives program code 405 as an input and generates program code 410 as output. Program code 405 and program code 410 can be specified in any of a variety of different formats, e.g., as source code, a high level programming language, an intermediate compiler format, an abstract syntax tree, or the like.

Program code 405 includes six original functions having identities (e.g., names) of "cat," "dog," "frog," "moose," "worm," and "rat" corresponding to original functions 1, 2, 3, 4, 5, and 6, respectively. Within the braces { } for each original function the algorithm implemented by the function along with the constants used is specified. Analysis of the original functions by compiler 150 can determine that original functions 1, 2, 3, 4, and 5 are members of a same function group, whereas original function 6 is not a member.

As shown, from program code 405, compiler 150 generates program code 410 which includes wrapper functions 415, an original function 420 corresponding to original function 6, and generalized functions 425. Each wrapper function has the same identity as the original function the wrapper function replaces. Further, each wrapper function includes a call to the generalized function that now implements the algorithm implemented by the original function replaced by the wrapper function. As shown, each algorithm has been split from the original function and implemented within its own generalized function. Thus, compiler 150 generates generalized_function_1 to implement algorithm_1 and generalized_function_2 to implement algorithm_2.

For example, wrapper function having an identity of "cat" replaces the original function having the identity of "cat." Further, as the original function "cat" implemented algorithm_I, the wrapper function "cat" calls generalized_function_1 that now implements algorithm_I. The wrapper function cat further provides the same constant data to generalized_function_1 that was utilized by the original function "cat."

In the example presented in FIG. 4, the original function having an identity of "rat" is left intact and unchanged since no other function in program code 405 utilizes the same algorithm, i.e., algorithm_III.

Referring to FIGS. 3 and 4, for a computer program that includes a collection of functions that call each other and are specified in program code of a particular type or format (a particular representation of the computer program), any transformation of that program as illustrated in FIGS. 3 and 4 ensures that any call to another function still calls that same (or equivalent) function after the transformation. At the conclusion of the processing, for example, every function in the output program code with a given name has identical functionality compared to the original function of the same or corresponding name in the input program code.

Figure 5:
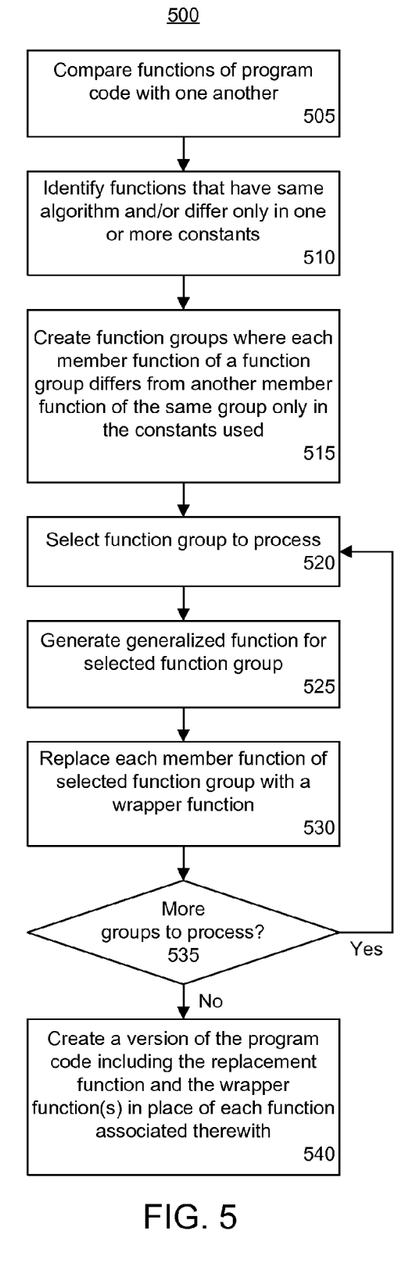
FIG. 5 is a flow chart illustrating a method of processing program code in accordance with another embodiment disclosed within this specification.

FIG. 5 is a flow chart illustrating a method 500 of processing program code in accordance with another embodiment disclosed within this specification. Method 500 can be implemented by a system such as system 100 of FIG. 1. Method 500 illustrates a process in which the program code provided as input is specified as source code in a high level programming language.

In block 505, the system can compare functions of the program code with one another. In comparing functions, the names of functions can be ignored for purposes of determining whether two or more functions implement a same algorithm. Functions that implement a same algorithm and that have same constants can be said to match. Functions that implement a same algorithm, e.g., are identical, that have one or more differing constants also can be said to match. Comments in the functions of the source code, like names or identities, also can be ignored for purposes of comparison if comments exist. In block 510, the system can identify functions that match. As noted, matching functions include functions that implement a same algorithm with same constants or functions that implement a same algorithm but differ only with respect to one or more constants.

In block 515, the system can create one or more function groups. Each function group can include member functions. In the case where the member functions implement a same algorithm with same constants, the member functions can be identical. Thus, the system can reduce duplicate program code where constants do not differ using similar wrapper function and generalized function generation techniques.

In the case where the member functions implement a same algorithm with different constants, each member function differs from each other member function of the same function group only in the constants that are used. Thus, depending upon the comparison performed and the functions included within the program code, the system can create one or more different function groups. Appreciably, a member function of a first function group will differ from a member function of a second and different function group by more than the constants used (and by more than function name). For example, a member function of a first function group implements a different algorithm than a member function of a second and different function group.

In block 520, the system can select a function group to process. In block 525, the system can generate a generalized function for the selected function group. When constants do not differ among member functions for the selected function group, no constants need be replaced within the resulting generalized function. If applicable, the system can replace each constant that differs among member functions of the selected function group with an argument. As discussed, for each constant set identified within the function group, the constants can be replaced by a corresponding argument that is unique to the constant set within the generalized function.

In block 530, the system can generate a functionally equivalent wrapper function, e.g., one wrapper function, for each member function in the selected function group. Each wrapper function can call the generalized function generated in block 525. If the wrapper function does not need to provide constant data, the wrapper function can simply call the generalized function. If the wrapper function does need to provide constant data, each wrapper function can be configured to call the generalized function and provide the generalized function with the appropriate values specific to the caller for the argument(s) used. As discussed, the particular value, or values, used for the arguments of each wrapper function can be different and are determined according to the particular member function being replaced by the wrapper function.

In block 535, the system can determine whether any further function groups remain to be processed. When one or more function groups remain to be processed, method 500 can loop back to block 520 to select a further function group and continue processing. When no further function groups remain to be processed, method 500 can proceed to block 540. In block 540, the system can create a new or replacement version of the program code received as input. The replacement version can include the generalized function(s) and the wrapper functions in place of each original function from the input program code determined to be within a function group.

Figure 6:
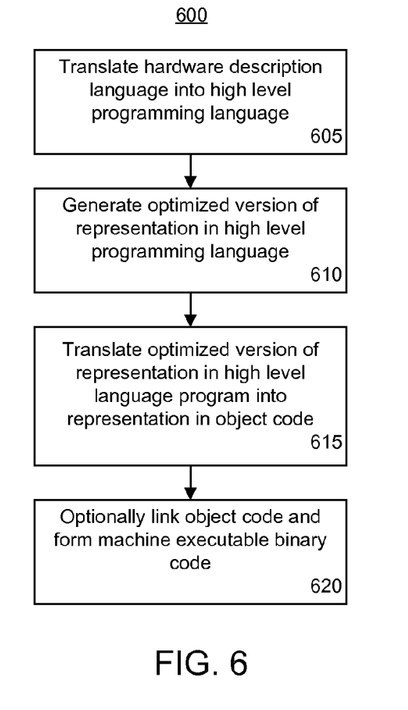
FIG. 6 is a flow chart illustrating a method of processing program code in accordance with another embodiment disclosed within this specification.

FIG. 6 is a flow chart illustrating a method 600 of processing program code in accordance with another embodiment disclosed within this specification. Method 600 can be implemented by a system such as system 100 of FIG. 1. Method 600 illustrates a process in which the program code is source code provided as input in the form of an HDL.

In block 605, the system can translate the HDL, which specifies a digital system such as a circuit, into source code in a different format such as a high level programming language. In block 610, the system can generate an optimized version of the representation of the source code in the high level programming language. For example, the system can implement the processing and/or operations described with reference to FIG. 5.

In block 615, the system can translate the optimized version of the source code in the high level programming language into a representation specified in a target code. As discussed, the target code can be object code, bytecode, or the like. The object code can include a bitstream that, when loaded into a programmable IC, implements the circuit and/or system specified by the HDL within the IC. In block 620, the system can optionally link object code that is generated and form executable binary file(s).

The one or more embodiments disclosed within this specification allow program code to be optimized through the elimination of redundant program code. Functions that implement the same algorithm and/or differ only with respect to constants can be represented using a generalized function and wrapper functions in which arguments are used in place of any constants that differ. In consequence, the amount of program code that requires processing during compilation can be reduced.

For purposes of explanation, specific nomenclature is set forth to provide a thorough understanding of the various inventive concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be embedded in a device such as a computer program product, which includes all the features enabling the implementation of the methods described herein. The device can include a data storage medium, e.g., a non-transitory computer-usable or computer-readable medium, storing program code that, when loaded and executed in a system including a processor, causes the system to perform at least a portion of the functions described within this specification. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various embodiments of the one or more embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The corresponding structures, materials, acts, and equivalents of all means or step plus function elements in the claims below are intended to include any structure, material, or act for performing the function in combination with other claimed elements as specifically claimed.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method, comprising:
   comparing functions specified in program code to identify a function group comprising a plurality of matching functions;
   generating, using a processor, a generalized function for the function group that implements an algorithm common to each of the plurality of matching functions;
   for each function of the function group, generating a wrapper function associated with the function;
   wherein each wrapper function calls the generalized function; and
   creating a version of the program code comprising the generalized function and the wrapper function in place of each function of the function group.

2. The method of claim 1, wherein the plurality of matching functions match except for a first constant; and
   wherein the generalized function comprises a first argument in place of the first constant.

3. The method of claim 2, wherein the wrapper function provides a value for the argument when calling the generalized function according to the constant within the function associated with the wrapper function.

4. The method of claim 2, wherein the plurality of functions match except for the first constant and a second constant; and
   wherein the generalized function includes a second argument, different from the first argument, in place of the second constant.

5. The method of claim 1, wherein the program code is source code.

6. The method of claim 1, further comprising:
   translating the version of the program code into object code.

7. The method of claim 1, further comprising:
   translating the version of the program code into bytecode.

8. The method of claim 1, further comprising:
   creating a plurality of function groups;
   wherein each member function of a function group differs from each other member function of the same function group only in a value of a constant; and
   wherein each member function of a function group differs from a member function of each different function group by more than a value of a constant.

9. A system, comprising:
   a processor configured to initiate executable operations comprising:
   comparing functions specified in program code to identify a function group comprising a plurality of matching functions;
   generating a generalized function for the function group that implements an algorithm common to each of the plurality of matching functions;
   for each function of the function group, generating a wrapper function associated with the function;
   wherein each wrapper function calls the generalized function; and
   creating a version of the program code comprising the generalized function and the wrapper function in place of each function of the function group.

10. The system of claim 9 wherein the plurality of matching functions match except for a first constant; and
    wherein the generalized function comprises a first argument in place of the first constant.

11. The system of claim 10, wherein the wrapper function provides a value for the argument when calling the generalized function according to the constant within the function associated with the wrapper function.

12. The system of claim 10, wherein the plurality of functions match except for the first constant and a second constant; and
    wherein the generalized function includes a second argument, different from the first argument, in place of the second constant.

13. The system of claim 9, wherein the program code is source code.

14. The system of claim 9, wherein the processor is further configured to initiate executable operations comprising:
    creating a plurality of function groups;
    wherein each member function of a function group differs from each other member function of the same function group only in a value of a constant; and
    wherein each member function of a function group differs from a member function of each different function group by more than a value of a constant.

15. A non-transitory computer-readable medium having instructions which, when executed by a processor, perform operations comprising:
    comparing functions specified in program code to identify a function group comprising a plurality of matching functions;
    generating a generalized function for the function group that implements an algorithm common to each of the plurality of matching functions;
    for each function of the function group, generating a wrapper function associated with the function;
    wherein each wrapper function calls the generalized function; and
    creating a version of the program code comprising the generalized function and the wrapper function in place of each function of the function group.

16. The non-transitory computer-readable medium of claim 15, wherein the plurality of matching functions match except for a first constant; and
    wherein the generalized function comprises a first argument in place of the first constant.

17. The non-transitory computer-readable medium of claim 16, wherein the wrapper function provides a value for the argument when calling the generalized function according to the constant within the function associated with the wrapper function.

18. The non-transitory computer-readable medium of claim 16, wherein the plurality of functions match except for the first constant and a second constant; and
    wherein the generalized function includes a second argument, different from the first argument, in place of the second constant.

19. The non-transitory computer-readable medium of claim 15, wherein the program code is source code.

20. The non-transitory computer-readable medium of claim 15, comprising further instructions that, when executed, cause the processor to perform operations comprising:
    creating a plurality of function groups;
    wherein each member function of a function group differs from each other member function of the same function group only in a value of a constant; and
    wherein each member function of a function group differs from a member function of each different function group by more than a value of a constant.

* * * * *